United States Patent [19]

Mehmet

[11] Patent Number: 5,023,060
[45] Date of Patent: Jun. 11, 1991

[54] RECOVERY OF GOLD BY A CARBON-IN-PULP PROCESS

[75] Inventor: Ahmet Mehmet, Johannesburg, South Africa

[73] Assignee: Council for Mineral Technology, South Africa

[21] Appl. No.: 390,699

[22] Filed: Aug. 7, 1989

[30] Foreign Application Priority Data

Aug. 24, 1988 [ZA] South Africa .................. 88/6268

[51] Int. Cl.$^5$ ............................................. C22B 3/24
[52] U.S. Cl. .......................................... 423/27; 423/29; 423/DIG. 16; 75/741
[58] Field of Search ................... 423/27, 29, DIG. 16; 422/145, 212, 219; 75/744, 741; 266/101, 168

[56] References Cited

U.S. PATENT DOCUMENTS

| | | | |
|---|---|---|---|
| 4,251,352 | 2/1981 | Shoemaker | 266/168 |
| 4,555,385 | 11/1985 | Stone | 266/168 |
| 4,816,234 | 3/1989 | Brison et al. | 75/744 |
| 4,830,758 | 5/1989 | Bodine | 75/744 |

Primary Examiner—Melvyn J. Andrews
Attorney, Agent, or Firm—Mason, Fenwick & Lawrence

[57] ABSTRACT

A process for adsorbing gold from a leach pulp by means of activated carbon is described in which the leach pulp (the leach solution together with the subdivided gold bearing ore) is diluted to a specific gravity of less than that of the activated carbon and is subsequently passed upwardly through a multistage liquid/solid contacting column. The contacting column is of the type having perforated plates or trays defining a series of vertically adjacent stages and the operation of the column has a cycle which includes a first part during which upward flow of diluted pulp fluidizes the activated carbon, a second part in which the carbon is allowed to settle on the trays and a third part during which a reverse flow of diluted pulp carries carbon downwardly through the column from one stage to another. In the third part of the cycle, loaded carbon is removed from the lowermost stage and treated to recover adsorbed gold therefrom.

10 Claims, 3 Drawing Sheets

RECOVERY OF GOLD BY A CARBON-IN-PULP PROCESS

FIELD OF THE INVENTION

This invention relates to the recovery of gold by adsorption thereof onto activated carbon in a process in which the carbon is contacted directly with the leach pulp composed of the leaching solution together with the subdivided gold bearing ore.

BACKGROUND OF THE INVENTION

The recovery of gold cyanide from a cyanide leach pulp (C.I.P. Process) by contact thereof with activated carbon has become an extremely successful method of recovery of dissolved gold resulting in high recoveries and, correspondingly, low losses in the tailings.

The commonly used C.I.P process involves the use of a series of tanks or pachucas in which the pulp and carbon are contacted countercurrently. This is generally achieved by having a steady flow of pulp through the series of adsorption vessels coupled with the periodic transfer of carbon, usually with its associated pulp, in a countercurrent direction. This arrangement involves the use of screens through which the pulp must flow in order to maintain the carbon in a particular vessel and these retaining screens do create appreciable problems.

Also, mechanical agitators are normally employed and these tend to abrade the carbon to some extent.

Furthermore the transfer of carbon in the countercurrent direction is generally achieved using either submersible pumps or airlifts, which constitute additional equipment with attendant capital costs and additional abrasion of the carbon granules.

The total residence time of the pulp in such a C.I.P gold recovery plant is generally of the order of about six hours and, accordingly, the size of the vessels has to be appreciable in order to provide for such an overall residence time.

It is the object of this invention to provide a process for the recovery of gold from leach pulp by the direct contacting thereof with activated carbon but wherein many disadvantages associated with the prior art stirred vessel arrangement are obviated and a plant of a smaller size can be used for the same throughput.

SUMMARY OF THE INVENTION

In accordance with this invention there is provided a process for the recovery of gold from leach pulp comprising the steps of:

(i) diluting the leach pulp to provide a specific gravity thereof which is less than that of activated carbon to be used for effecting gold extraction;

(ii) contacting the diluted pulp with activated carbon in countercurrent fashion in a multi-stage liquid/solid contact column of the type in which the stages are defined by transverse plates or trays, said contact being effected by:

(a) causing the diluted pulp to flow upwardly through the stages of the contact column at a superficial velocity chosen to fluidise activated carbon therein during a first part of a cycle;

(b) causing the pulp flow velocity to decrease to allow settling of the carbon onto the plates or trays in a second part of the cycle;

(c) reversing the flow of pulp to cause a downward flow of carbon through the stages within the column and some carbon to be removed from the lowermost stage thereof in a third part of the cycle;

(d) adding fresh or re-activated carbon at an upper stage; and, (e) recommencing the first part of the cycle, and, (iii) recovering adsorbed gold from carbon removed from the column during the third part of the cycle.

Further features of the invention provide for the plates or trays to be simple perforated plates or trays; for the activated carbon to be in a form in which the individual elements thereof are substantially uniform in shape, size and density; for the pulp to be screened to remove oversized particles prior to introduction thereof into the column; and for the plate or tray defining the lowermost stage to be designed to prevent activated carbon from passing therethrough whilst allowing the upward flow of pulp therethrough in which case lateral outlets for the pulp and carbon from the lowermost stage are provided.

Still further features of the invention provide for loaded carbon removed from the lowermost stage to be eluted, initially if necessary with acid to remove adsorbed calcium carbonate followed by elution of gold using any acceptable elution process such as the Zadra or Aarl procedures; for the barren overflow pulp to be treated in suitable equipment, for example a thickener, from which the overflow solution can be recycled as diluent for pregnant undiluted pulp, or as solution fed to a grinding mill in the circuit, and for the flow to be discontinued in the column during the second part of the cycle, conveniently simply by opening a diverter outlet beneath the lowermost stage of the column.

In order that the invention may be more fully understood, the use of a pilot plant contactor in certain tests will now be described with reference to the accompanying drawings.

DETAILED DESCRIPTION WITH REFERENCE TO THE DRAWINGS

Figure 1:
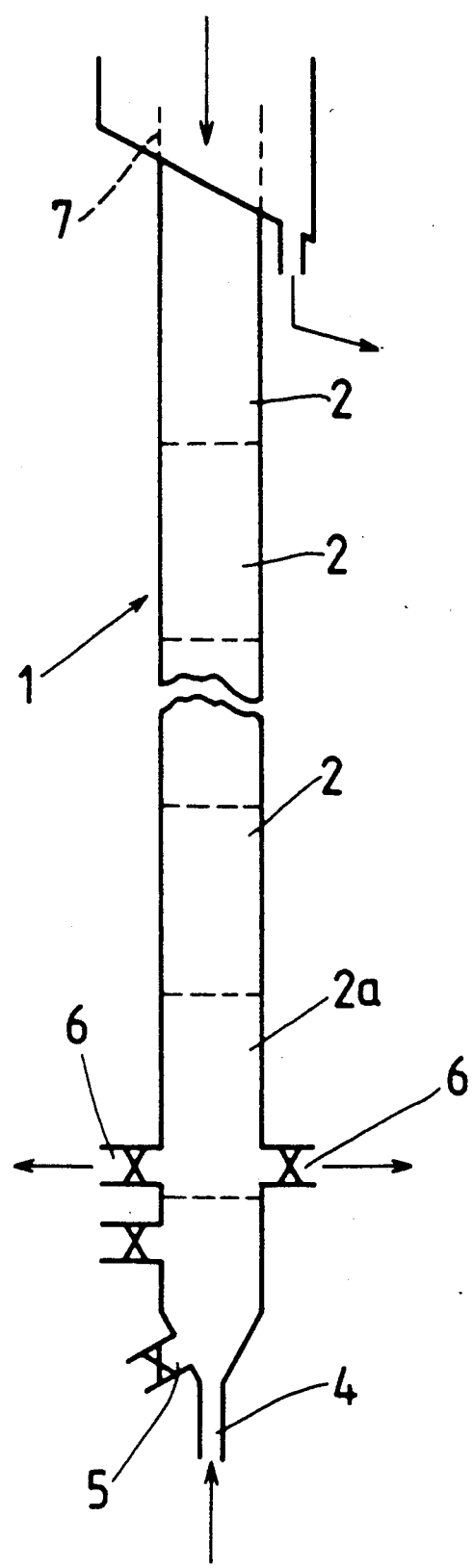
FIG. 1 is a schematic elevation of the contact column employed in the process of this invention.

For the purposes of testing the process of this invention, a liquid solid contact column 1 divided into thirteen stages 2 by means of perforated plates 3 was employed. The perforated plates in the case of all but the lowermost one 3a have 15 mm diameter holes therethrough amounting, in total area, to 9% of the area of the plate and, in the case of the lowermost plate 3a, holes of 7,5 mm in diameter were provided to a total of 7,6% of the area of the plate. These sizes were determined empirically after prolonged testwork and were chosen for use with an activated carbon having elements of substantially uniform shape namely cylinders of approximately 1,4 mm in diameter and 3,5 mm long.

The feed inlet 4 for pulp is located at the bottom of the column at the apex of a conical end and a valve-controlled diverter outlet 5 is provided in the conical sidewall thereof. The lowermost stage 2a is provided with valve-controlled, laterally directed outlets 6 and the uppermost stage is provided with a freeboard 7 to prevent the entrainment of carbon out of the column.

Figure 2:
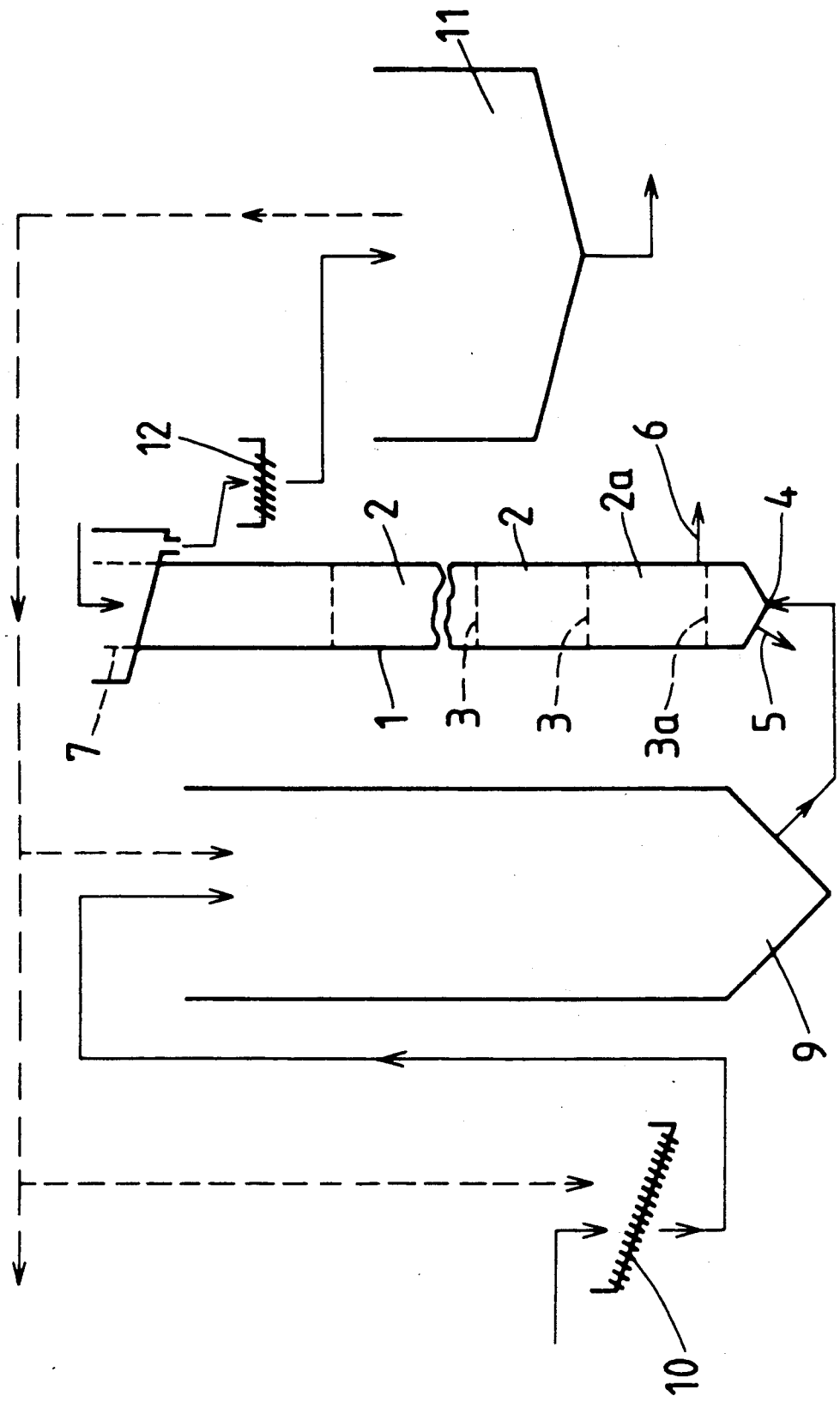
FIG. 2 is a schematic flow sheet of a proposed composite process according to this invention; and, FIG. 3 is a flow diagram of a milling-in-cyanide circuit employing the multi-stage adsorption column to recover gold from the cyclone overflow.

For use, as shown in FIG. 2, the inlet to the column is connected to a pulp storage tank 9 in which diluted pulp is maintained in an agitated condition, conveniently by aeration. The pulp storage tank is in turn supplied with pulp which has been screened through a micro-screen 10 and overflow solution from a thickener 11 is recycled either to the pulp storage tank or the screen or to a location before the screen to effect the required dilution of the "run-of-the-mill" pulp. The thickener 11 receives the barren pulp from the upper end of the column, this pulp being passed through a 'catch' screen 12 simply to recover any carbon which may become entrained in the pulp.

When the column is in use, pulp is introduced through the inlet at the center of the conical bottom end and flows upwardly, fluidising carbon in each stage. During this part of the cycle the barren pulp flows into an overflow launder and leaves the column via the barren pulp outlet to the thickener via the 'catch' screen 12. With the particular activated carbon employed in the tests, namely that sold under the trade name Norit RO 3515 (manufactured by NORIT N.V. of the Netherlands), the pulp was diluted from a run-of-the-mill density of about 1,50 g/cm$^3$ to a maximum of 1,20 g/cm$^3$ and preferably to 1,17 g/cm$^3$. With a pulp of this density and screened through a micro-screen to remove particle sizes greater than 200µm, a fluidised bed expansion of 150% (which represented a carbon concentration of 150 g/l) was achieved at a superficial pulp flow rate of 20 mm/sec. This gave a residence time of pulp in the column of 9,6mins. (based on the pulp superficial velocity) as opposed to the usual six hours using 25 g/l in a conventional carbon-in-pulp plant. Thus, in spite of the dilution of the pulp, a column contactor of substantially smaller size than a conventional plant will be required. It is anticipated, from the information developed, that a commercial contacting column operating according to the invention will have seventeen stages. On this basis the factor of reduction in working volume is approximately 9,4 with each stage having a height of one meter.

The second part of an operating cycle is commenced by opening the diverter outlet 5 thereby causing the pulp in the column to remain stationary and the carbon in each stage to settle onto the respective plates. Settling is allowed to take place generally for a time period of approximately one minute in the equipment used for test porposes.

The third part of the operating cycle is then commenced by opening the lateral outlets 6 from the lowermost stage 2a and allowing pulp and carbon to flow out and, accordingly, some pulp and settled carbon to move down from each stage to the next lower stage in the column with the carbon passing through the holes in the perforated plates. The pulp and carbon flowing out of the column is passed to a screen to retain the carbon and the pulp is recycled to the pulp storage tank or to the milling circuit.

It was found that the withdrawal of loaded carbon out of the column caused a downward flow of nearly the same amount of carbon through the stages so that at the end o the carbon transfer period all the stages, with the exception of the top stage, contained nearly the same amount of carbon as they did before the carbon transfer.

Reactivated or fresh carbon is introduced into the top stage and the first part of the next cycle is commenced by closing the diverter outlet 5.

As indicated above, the barren pulp from the top of the column is passed to a thickener via the screen 12 and the overflow from the thickener is used to dilute fresh supplies of run-of-the-mill pulp.

In tests carried out on a column of the above described type the run-of-the-mill pulp having a density of 1,5 g/cm$^3$ was diluted to provide a pulp having a density of 1,17. The gold content of the diluted pulp was about 2 p.p.m. but clearly fluctuated. The results of pilot plant work at steady state from the 13th to the 24th day are set out in Table 1 below from which the efficiency of the process can be clearly observed. The results shown strongly suggest that a column with seventeen stages would probably produce barren pulp having a gold content of less than 0,01 p.p.m. during the entire adsorption part of the cycle which was very close to twenty-four hours in the case of the tests conducted.

Figure 3:
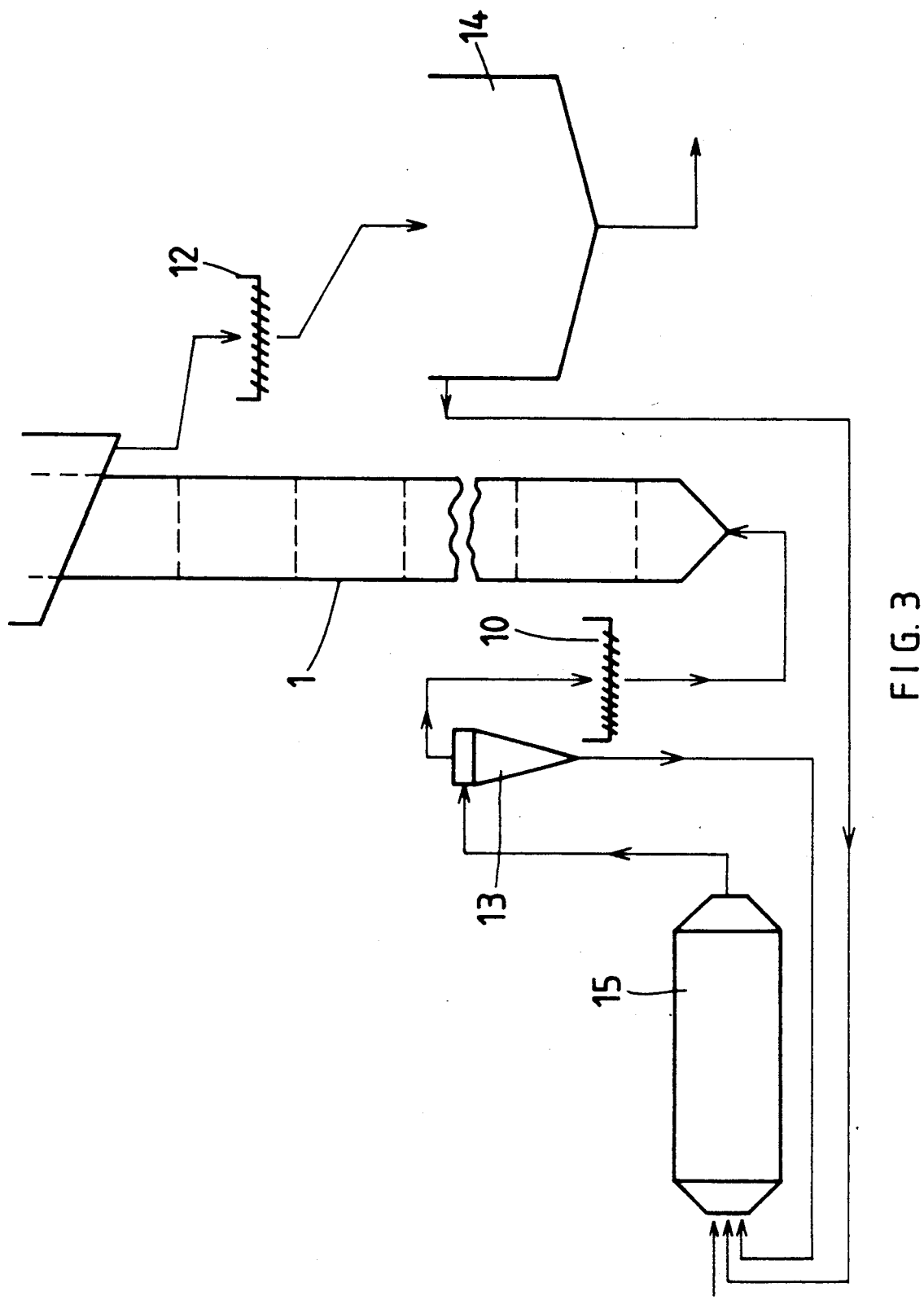

A further potential application of this invention, described with reference to FIG. 3, is for the recovery of dissolved gold from cyclone overflow in plants using a milling-in-cyanide process. In this application, the overflow from a cyclone 13, having a suitable concentration of solids as feed to the fluidized-bed adsorption column and containing the dissolved gold, is passed through a micro-screen 10 and introduced into the adsorption column 1, as described above. The barren pulp leaving the column 1, after passing through a 'catch' screen 12, is directed into a thickener 14. The overflow solution from the thickener 14, containing free CN$^-$, is recycled to the mill 15.

TABLE 1

| | | Daily adsorption results of gold at the carbon-in-pulp -in column (CIPIC) pilot plant | | | | | | |
|---|---|---|---|---|---|---|---|---|
| | Au concn. in feed pulp | Au concn. in barren pulp. p.p.m. | | Extraction % | | Au concn. on loaded carbon | Au concn. on carbon put into column, | pH of the feed |
| Day | p.p.m. | 12 h | 24 h | 12 h | 24 h | g/t | g/t | pulp |
| 13 | 2,04 | 0,023 | 0,028 | 98,87 | 98,63 | 5360 | <10 | 11,03 |
| 14 | 2,03 | 0,009 | 0,030 | 99,56 | 98,52 | 6920 | <10 | 10,98 |
| 15 | 2,10 | 0,016 | 0,028 | 99,24 | 98,67 | 5925 | 10 | 11,09 |
| 16 | 2,10 | 0,017 | 0,030 | 99,19 | 98,57 | 5245 | 16 | 10,76 |
| 17 | 2,10 | 0,009 | 0,019 | 99,57 | 99,10 | 5100 | <10 | 10,31 |
| 18 | 2,00 | 0,008 | 0,008 | 99,60 | 99,60 | 6900 | 16 | 10,08 |
| 19 | 1,81 | 0,006 | 0,025 | 99,67 | 98,62 | 7500 | <10 | 10,53 |
| 20 | 1,79 | 0,015 | 0,060 | 99,16 | 96,65 | 6200 | <10 | 11,34 |
| 21 | 1,86 | — | 0,065 | — | 96,51 | 6900 | <10 | 11,24 |
| 22 | 1,91 | 0,016 | 0,050 | 99,16 | 97,38 | 6150 | <10 | 11,30 |
| 23 | 2,10 | 0,010 | 0,020 | 99,52 | 99,05 | 6500 | 13 | 11,15 |
| 24 | 2,20 | 0,005 | 0,011 | 99,77 | 99,50 | 6725 | 15 | 10,99 |

TABLE 1-continued

| | Daily adsorption results of gold at the carbon-in-pulp-in column (CIPIC) pilot plant | | | | | | | |
|---|---|---|---|---|---|---|---|---|
| | Au concn. in feed pulp | Au concn. in barren pulp. p.p.m. | | Extraction % | | Au concn. on loaded carbon | Au concn. on carbon put into column, | pH of the feed |
| Day | p.p.m. | 12 h | 24 h | 12 h | 24 h | g/t | g/t | pulp |
| Av. | 2,00 | 0,012 | 0,031 | 99,39 | 98,40 | 6290 | <11 | 10,90 |

The underflow from the thickener 14 is treated for the recovery of undissolved gold by further leaching and a suitable gold recovery process (e.g. carbon-in-pulp or filtration or counter-current decantation process). The recovery of gold from the cyclone overflow will significantly reduce the load on the downstream gold recovery circuit, and reduce the gold values of solution into the thickener and in the solution returning to the mill.

It is envisaged that the use of a process according to this invention will have a number of advantages over the presently used stirred vessel equipment. Firstly there is a substantial reduction in size of the equipment as indicated above because a very high carbon concentration can be used in each stage. Secondly, there is a gentler action on the carbon which may enable softer, and possibly more active carbons to be used. Thirdly, there is also no mechanical agitation, airlifts, interstage screens or the like and, accordingly, there is no adverse effect of wood chips which are so often troublesome, particularly where interstage screens are employed. It is also believed that there is a much greater efficiency in the contacting of a pulp and carbon with a minimum of back-mixing, by-passing or dead spaces as is believed to take place to a certain extent in the existing types of stirred vessel equipment. The use of many more stages (a factor of two or three over conventional equipment) will also produce a higher concentration of gold on the loaded carbon.

The invention therefore provides a potentially useful and effective process for the adsorption of gold onto activated carbon.

What we claim as new and desire to secure by Letters Patent is:

1. A process for the recovery of gold from leach pulp comprising the steps of:
   (i) diluting the leach pulp to provide a specific gravity thereof which is less than that of activated carbon to be used for effecting gold extraction;
   (ii) contacting the diluted pulp with activated carbon in countercurrent fashion in a multi-stage liquid/solid contact column in which the stages are defined by transverse plates or trays, said contact being effected by:
      (a) causing the diluted pulp to flow upwardly through the stages of the contact column at a superficial velocity chosen to fluidise activated carbon therein during a first part of a cycle;
      (b) causing the pulp flow velocity to decrease to allow settling of the carbon onto the plates or trays in a second part of the cycle;
      (c) reversing the flow of pulp to cause a downward flow of carbon through the stages within the column and some carbon to be removed from the lowermost stage thereof in a third part of the cycle;
      (d) adding fresh or re-activated carbon at an upper stage; and,
      (e) recommencing the first part of the cycle, and,
   (iii) recovering adsorbed gold from carbon removed from the column during the third part of the cycle.

2. A process as claimed in claim 1 in which the plates or trays are simple perforated plates.

3. A process as claimed in claim 1 in which the activated carbon is in form in which individual elements thereof are of substantially uniform shape size and density.

4. A process as claimed in claim 3 in which the individual elements of activated carbon are of a basically cylindrical shape.

5. A process as claimed in claim 1 in which the pulp is screened to remove oversized particles prior to introduction thereof into the column.

6. A process as claimed in claim 1 in which the plate or tray defining the lowermost stage is designed to substantially prevent activated carbon from passing therethrough whilst allowing the upward flow of pulp therethrough in which case lateral outlets for the pulp and carbon from the lowermost stage are provided.

7. A process as claimed in claim 1 in which loaded activated carbon removed from the lowermost stage is eluted to recover gold therefrom.

8. A process as claimed in claim 1 in which the initial pulp is diluted with overflow solution recycled from a thickener through which the barren overflow leach solution is passed.

9. A process as claimed in claim 1 in which the flow of pulp through the column is stopped during the said second part of the cycle.

10. A process as claimed in claim 9 in which the flow is stopped by opening a diverter outlet beneath the lowermost stage of the column.

* * * * *